United States Patent Office 3,024,285
Patented Mar. 6, 1962

3,024,285
PREPARATION OF DIETHERS OF POLYMETHYLOL DIPHENYLOLALKANES
Pieter Bruin and Jan Selman, Amsterdam, Netherlands, assignors to Shell Oil Company, New York, N.Y., a corporation of Delaware
No Drawing. Filed Dec. 27, 1954, Ser. No. 477,942
Claims priority, application Netherlands Feb. 15, 1954
4 Claims. (Cl. 260—613)

This invention relates to diethers of polymethylol diphenylolalkanes and a process for manufacturing the same as well as useful compositions containing the diethers.

According to the process of the invention, a dialkali salt of a polymethylol diphenylolalkane of the formula

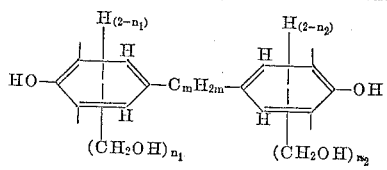

wherein $n_1$ and $n_2$ are each members of the group consisting of the numbers 0, 1 and 2, and $n_1+n_2$ is a whole number of 2 to 4 (2, 3 or 4), and $m$ is an integer preferably not greater than 10, is reacted with a halogenated hydrocarbon having the halogen atom linked to a saturated aliphatic carbon atom. The resulting product of the invention is a diether of a polymethyol diphenylolalkane of the formula

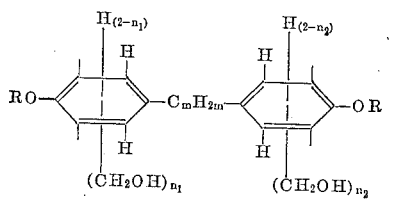

wherein $n_1$ and $n_2$ are members of the group consisting of the numbers 0, 1 and 2, $n_1+n_2$ is a whole number of 2 to 4, $m$ is an integer and R is a hydrocarbon radical having a saturated aliphatic carbon atom linked to the ether oxygen atom. In other words, the product is a diether of a p,p'-diphenylolalkane containing two to four methylol groups linked in ortho positions and having the hydrogen atoms of the phenolic hydroxyl groups substituted by hydrocarbon radicals which are attached to the ether oxygen atoms by saturated aliphatic carbon atoms.

The starting polymethylol diphenylolalkane is obtained by condensing formaldehyde with a p,p'-diphenylolalkane in known manner. For this purpose, any of the various p,p'-diphenylolalkanes are suitable including such compounds as bis-(4-hydroxyphenyl)methane, 1,2-bis(4-hydroxyphenyl)ethane, 1,3-bis(4-hydroxyphenyl)propane, 1,5-bis(4-hydroxyphenyl)pentane, 2,4 - bis(4 - hydroxyphenyl) - 2 - methylpentane, 2,5-bis(4-hydroxyphenyl)hexane, 1,10-bis(4-hydroxyphenyl)decane, 1,12-bis-(4-hydroxyphenyl)octadecane, 2,12-bis(4-hydroxyphenyl)octadecane, etc., as well as preferred gem-substituted alkanes such as 1,1-bis(4-hydroxyphenyl)ethane, 2,2-bis-(4-hydroxyphenyl)propane, 2,2-bis(4-hydroxyphenyl)butane, 1,1 - bis(4 - hydroxyphenyl)butane, 1,1 - bis(4 - hydroxyphenyl)isobutane, 2,2-bis-(4-hydroxyphenyl) - 4 - methylpentane, 4,4-bis(4-hydroxyphenyl) - 2,6-dimethylheptane and the like. It is preferred that the alkane group contain 1 to 10 carbon atoms. Because of ready availability and low cost, the diethers of the invention are most preferably derived from 2,2-bis(4-hydroxyphenyl)propane. By using a basic catalyst such as sodium hydroxide, the p,p'-diphenylolalkane condenses with the formaldehyde in an aqueous medium during several days' time to give the polymethylol compound. By regulating the molecular proportion of formaldehyde to the phenol, the number of methylol groups contained in the product may be varied from two to four. The product is not ordinarily a single chemical entity, but is usually a mixture of compounds containing different degrees of methylol substitution.

The diethers are obtained by reacting a dialkali salt of the polymethylol diphenylolalkane with the halogenated hydrocarbon. For this purpose, the alkali metal salts such as the sodium salt are very suitable. The halogenated hydrocarbon is of the type R-Hal wherein R is a saturated or unsaturated aliphatic, cyclo-aliphatic or aryl-substituted aliphatic group having the halogen atom, which is preferably chlorine or bromine, linked directly to a saturated aliphatic carbon atom. Typical compounds include ethyl bromide, propyl chloride, isobutyl bromide, butyl chloride, heptyl chloride, allyl bromide, allyl chloride, propargyl chloride, methallyl chloride, crotyl chloride, 2-pentenyl chloride, 2-methyl-2-butenyl bromide, 2-hexenyl chloride, cyclohexyl chloride, methylcyclohexyl chloride and benzyl chloride. The beta, gamma-monoolefinic halides, particularly allyl chloride, are preferred as reactants.

The process of the invention is executed by forming the salt of the phenol and then adding the halogenated hydrocarbon while keeping the reaction mixture at about 25 to 75° C. It is helpful to have present a lower alcohol such as ethanol in the reaction mixture. The reactants are usually brought together at a temperature in the neighborhood of 30° C., and then the temperature is increased to about 60° C. for a number of hours in order to complete the reaction. The product is ordinarily recovered from the reaction mixture with a low boiling solvent which is substantially water-immiscible such as diethyl ether, diisopropyl ether, amyl alcohol and the like. The extracting solvent is then removed from the extract by distillation so as to leave the diether product as residue.

The diether products of the invention are substances wherein the hydrogen atoms of the phenolic hydroxyl groups of the p,p'-diphenylolalkane containing two to four methylol groups linked thereto in ortho position to the phenolic hydroxyl groups have been replaced with the hydrocarbon radical which was linked to the halogen atom of the hydrocarbon halide used in preparing the diether. Particularly preferred diethers are the diallyl and the dimethallyl ethers of a methylol-substituted 2,2-bis(4-hydroxyphenyl)propane containing two to four methylol groups linked thereto in ortho positions to the phenolic hydroxyl groups.

The diethers are usually solids or very viscous substances at ordinary temperature. They are very useful materials in that they resinify to hard materials when baked in the presence of acidic catalysts such as phosphoric acid and p-toluene sulfonic acid. They are particularly useful when combined with glycidyl polyethers of polyhydric phenols since these compositions cure to hard tough substances which are ideally suited as protective coating materials.

When mixed with glycidyl polyethers of one or more polyhydric phenols with an average number of 1,2-epoxy groups per molecule of more than 1.0 the diethers of polymethylol diphenylolalkanes thus prepared were found to yield a composition which, after curing with acid curing agents, is particularly suitable for the formation of coatings since the resultant cured products have an excellent resistance against water, caustic alkali and organic solvents as well as good flexibility, impact strength and hardness.

The invention is illustrated, but not limited, by the following examples.

*Example 1*

About 40 grams of a polymethylol compound of 2,2- diphenylol propane containing an average number of approximately 3.5 methylol groups per molecule, were dissolved in 40 grams of absolute ethanol. The resultant solution was heated at 30° C., at which temperature 94.5 grams of a 10% sodium hydroxide solution and then 27 grams of allyl chloride (1.5 times the quantity calculated) were stirred dropwise into the mixture. The temperature was then gradually raised to 60° C. in 2 hours, after which the solution was kept at this temperature for 12 hours.

The solution was subsequently extracted with ether. The resultant ether solution was shaken with a 10% sodium hydroxide solution a few times, washed with water and dried over $Na_2SO_4$. After the solvent was distilled off 26 grams of diallyl ether of 2,2-diphenylol propane was obtained, comprising an average number of 3.5 methylol groups per molecule (54% of the theoretical yield).

The methylol-substituted 2,2-diphenylol propane used in this example was prepared by mixing 228 grams of pure 2,2-diphenylol propane with a solution of 27.5 grams of NaOH in 55 cc. of water, after which the mixture was added to 330 cc. of a 37% formaldehyde solution while stirring. After the diphenylol propane was dissolved, the mixture was allowed to stand at room temperature for 4 days and then 300 cc. of 10% $H_2SO_4$ were added while stirring, thus raising the pH of the reaction mixture to about 9. Carbon dioxide was subsequently passed into the reaction mixture until the pH decreased to 8 and remained constant at this value. Two layers were formed, the lower of which was washed out three times with water and then absorbed in acetone after which it was purified from water and acetone at a pressure of 23 mm. and a temperature of not more than 40° C. 290 grams of a product was obtained containing an average number of approximately 3.5 methylol groups per molecule.

*Example 2*

The preparation of the diallyl ether of a polymethylol compound of 2,2-diphenylol propane containing an average number of about 3.5 methylol groups per molecule, was repeated in the manner described in Example 1 with the exception that in this case a solution of 9.4 grams of NaOH in 38 grams water and 112 grams of absolute ethanol was added dropwise. The diallyl ether yield was 32 grams (66% of theoretical yield).

*Example 3*

To a 40% solution of a glycidyl polyether with an average number of 1.45 epoxy groups per molecule, a softening point of 131° C. and a molecular weight of 2900, in a mixture of equal quantities of ethyl ether of ethylene glycol acetate and toluene, such a quantity of diallyl ether of tetramethylol-2,2-diphenylol propane was added that the glycidyl polyether and the diallyl ether were present in a ratio of 70:30 parts by weight. 1.5 parts of $H_3PO_4$ per 100 parts of the mixture were added at the same time in the form of a 10% $H_3PO_4$ solution in butanol, thus preventing excessive local heat generation owing to $H_3PO_4$ accumulation.

The resultant solution was then diluted to spraying viscosity with a mixture of equal parts of ethyl ether of ethylene glycol acetate and toluene and then sprayed on to sandblasted iron panels. After the solvents were allowed to evaporate from the panels at room temperature, the latter were baked at a temperature of 200° C. for 10, 30, 45 and 60 minutes, respectively. The resultant cured coatings were then tested.

The flexibility of the coatings was determined by bending over a 3.125 mm. mandril and was found to be good at all the baking times, as was also the impact strength. The latter was determined by means of a 910 gram weight having a spherical end on the bottom with a radius of 9 mm. and which was dropped from a height of 105 cm. upon the reverse side of the panel.

With a baking time of 10 minutes the so-called pencil hardness of the resultant coating was good and was found to be 6 H, i.e., the coating was not damaged when scratched with the point of a pencil with a hardness of 6 H. When using the other baking times, viz. 30, 45 and 60 minutes, the pencil hardness was very good and was found to be greater than 8 H.

With all the baking times the resultant coatings were found to have good water resistance since the coatings remained unchanged when brought into contact with boiling water for 4 hours.

The coatings obtained with the various baking times were also found to have a good resistance against caustic alkali since they were unaffected when treated with a boiling 20% sodium hydroxide solution for 6 hours.

Even with a baking time for 15 minutes the solvent resistance was found to be satisfactory. The solvent resistance was determined by bringing the coating into contact with acetone for 5 minutes at a temperature of 23° C.

The solvent resistance of the coatings obtained with the other baking times was found to be very good since, after being submerged in acetone for 20 minutes, they did not show any softening (very severe test).

*Example 4*

About 75 parts of the glycidyl polyether mentioned in Example 1, 25 parts of the diallyl ether also described in Example 1, and 1.5 parts of $H_3PO_4$ were dissolved in a mixture of equal quantities of ethyl ether of ethylene glycol acetate and toluene. 0.5 part of polyvinyl butyral resin (for example Butvar B–76) was added as a 10% solution in n-butanol to the solution obtained. The solution was poured out on to a glass plate and the resultant coating was cured by heating for 20 minutes at 200° C. The coating obtained was found to have very few pores. If 1.0, 1.5 or 2.0 parts of polyvinyl butyral resin respectively were added to the above solution, the coatings obtained therefrom were found to be entirely free from imperfections.

We claim as our invention:

1. A diether of a polymethylol diphenylolalkane of the formula

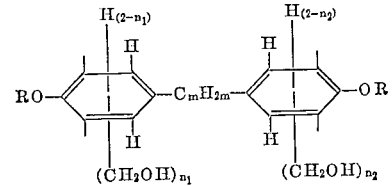

wherein $n_1$ and $n_2$ are integers of 1 to 2, $n_1+n_2$ is a whole number of 2 to 4, $m$ is an integer of 1 to 10, and R is a hydrocarbon radical of 2 to 7 carbon atoms having a saturated aliphatic carbon atom linked directly to the ether oxygen atom.

2. A diallyl ether of a p,p'-diphenylolalkane of 13 to 22 carbon atoms containing two to four methylol groups linked in ortho position to the phenolic hydroxyl groups.

3. Diallyl ether of a methylol-substituted 2,2-bis(4-hydroxyphenyl)propane containing two to four methylol groups linked in ortho positions to the phenolic hydroxyl groups.

4. Dimethallyl ether of a methylol-substituted 2,2-bis (4-hydroxyphenyl)propane containing two to four methylol groups linked in ortho positions to the phenolic hydroxyl groups.

References Cited in the file of this patent
UNITED STATES PATENTS

| | | |
|---|---|---|
| 1,990,985 | Fonrobert et al. | Feb. 12, 1935 |
| 2,521,911 | Greenlee | Sept. 12, 1950 |
| 2,560,350 | Jelinek | July 10, 1951 |